US009800081B2

(12) United States Patent
Chu

(10) Patent No.: US 9,800,081 B2
(45) Date of Patent: Oct. 24, 2017

(54) WIRELESS POWER TRANSMITTER AND OPERATION METHOD OF THE SAME

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 156 days.

(21) Appl. No.: 14/854,061

(22) Filed: Sep. 15, 2015

(65) Prior Publication Data

US 2016/0079803 A1 Mar. 17, 2016

Related U.S. Application Data

(60) Provisional application No. 62/050,213, filed on Sep. 15, 2014.

(51) Int. Cl.
| | |
|---|---|
| *H02J 7/00* | (2006.01) |
| *H02J 7/02* | (2016.01) |
| *H04B 5/00* | (2006.01) |
| *H02J 50/10* | (2016.01) |
| *H02J 50/80* | (2016.01) |

(52) U.S. Cl.
CPC ............ *H02J 7/025* (2013.01); *H02J 7/0047* (2013.01); *H02J 50/10* (2016.02); *H02J 50/80* (2016.02); *H04B 5/0037* (2013.01); *H02J 2007/005* (2013.01)

(58) Field of Classification Search
CPC .. H02J 5/005; H02J 17/00; H02J 7/025; H02J 50/80; H02J 7/0052; H02J 7/0027; H02J 50/40; H02J 7/0004; H02J 50/20; H02J 7/0044; H02J 50/12; H02J 7/0042; H02J 50/23; H02J 7/0013; H02J 7/0047

USPC .................................................. 320/107–115
See application file for complete search history.

(56) References Cited

U.S. PATENT DOCUMENTS

| | | | | |
|---|---|---|---|---|
| 2009/0058361 A1* | 3/2009 | John | .................... | A61N 1/3785 320/128 |
| 2015/0008876 A1* | 1/2015 | Kwak | .................... | H02J 7/025 320/108 |
| 2015/0171657 A1* | 6/2015 | Wheeland | ............... | H02J 7/025 307/104 |

OTHER PUBLICATIONS

Wireless power consortium, "System Description, wireless power transfer" vol. I, part I, version 1.1.2, Jun. 2013.
(Continued)

*Primary Examiner* — Binh Tat
(74) *Attorney, Agent, or Firm* — CKC & Partners Co., Ltd.

(57) ABSTRACT

A wireless power transmitter that includes a power transmitting module, a communication module and a processing module is provided. The power transmitting module provides a wireless power to a wireless power receiver. The processing module receives a first request message from a remote mobile device through the communication module to request charging information of the wireless power receiver, determines whether the charging information is available, transmits available information to the remote mobile device under a condition that at least first part of the charging information is available, receives provided information from the wireless power receiver through the communication module under a condition that at least second part of the charging information is not available, and transmits the provided information through the communication module to the remote mobile device.

18 Claims, 4 Drawing Sheets

(56) References Cited

OTHER PUBLICATIONS

Wireless power consortium, "System Description, wireless power transfer" vol. II, part 1, version 0.9 rev 8 Jun. 2013.
Alliance for Wireless Power, "A4WP Wireless Power Transfer System Baseline System Specification (BSS)" v1.2, Jan. 29, 2014.

* cited by examiner

WIRELESS POWER TRANSMITTER AND OPERATION METHOD OF THE SAME

RELATED APPLICATIONS

This application claims priority to U.S. Provisional Application Ser. No. 62/050,213, filed Sep. 15, 2014, which is herein incorporated by reference.

BACKGROUND

Field of Invention

The present invention relates to a wireless power transfer technology. More particularly, the present invention relates to a wireless power transmitter and an operation method of the same.

Description of Related Art

In the future, it is expected that wireless power chargers will be widely adopted and deployed in both public and private spaces. People can charge their mobile devices and batteries by simply placing them closed to the wireless power charger. In some cases, the user may place the devices or batteries on the charger and leave for other business. After a while, the user may want to know the charging status of the devices or batteries. However, an efficient way to check the charging status of the devices or batteries is still unavailable.

Accordingly, what is needed is a wireless power transmitter and an operation method of the same to address the above issues.

SUMMARY

The invention provides a wireless power transmitter. The wireless power transmitter includes a power transmitting module, a communication module and a processing module. The power transmitting module provides a wireless power to a wireless power receiver. The processing module is electrically connected to the power transmitting module and the communication module, and the processing module is configured for receiving a first request message from a remote mobile device through the communication module to request charging information of the wireless power receiver, determining whether the charging information is available, under a condition that at least first part of the charging information is available, transmitting available information including the at least first part of the charging information through the communication module to the remote mobile device, under a condition that at least second part of the charging information is not available, receiving provided information including the at least second part of the charging information from the wireless power receiver through the communication module and transmitting the provided information through the communication module to the remote mobile device.

Yet another aspect of the present invention is to provide an operation method used in a wireless power transmitter. The operation method includes the steps outlined below. A wireless power is provided to a wireless power receiver by a power transmitting module. A first request message is received from a remote mobile device through a communication module to request charging information of the wireless power receiver. Whether the charging information is available is determined. Under a condition that at least first part of the charging information is available, available information including the at least first part of the charging information of the wireless power receiver is transmitted through the communication module to the remote mobile device. Under a condition that at least second part of the charging information is not available, provided information including the at least second part of the charging information is received from the wireless power receiver through the communication module. The provided information is transmitted through the communication module to the remote mobile device.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
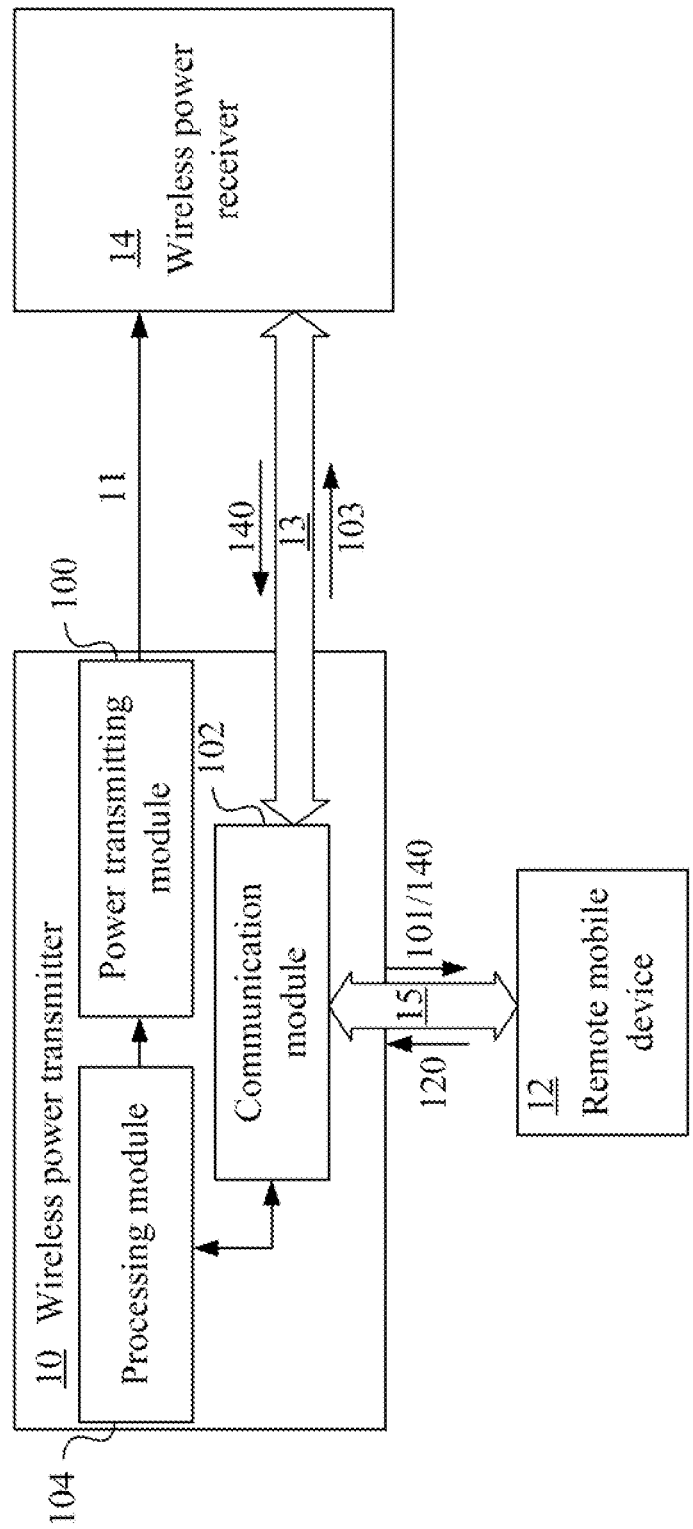
FIG. 1 is a block diagram of a wireless power transmitter, a remote mobile device and a wireless power receiver in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a block diagram of a wireless power transmitter 10, a remote mobile device 12 and a wireless power receiver 14 in an embodiment of the present invention.

In an embodiment, the wireless power transmitter 10 can be implemented by any charging device such as, but not limited to wireless charging pad. The wireless power receiver 14 can be implemented by any device that can receive power, such as but not limited to a smartphone, a smart watch, a smart shoes, a smart T-shirt a smart ring, a smart glass or a smart belt. In an embodiment, the wireless power receiver 14 can be implemented by an electric car. In an embodiment, the remote mobile device 12 is a device having the ability to interact with a user through different modules disposed therein such as, but not limited to a screen, a keyboard, a microphone or a speaker. In different embodiments, the remote mobile device 12 can be a smartphone, a tablet personal computer, a personal computer, a smart watch, a smart headphone or other wearable devices.

The wireless power transmitter 10 includes a power transmitting module 100, a communication module 102 and a processing module 104. The power transmitting module 100 is configured for providing a wireless power 11 to the wireless power receiver 14. In an embodiment, the power transmitting module 100 includes a coil and an analog circuit (not illustrated) such that the wireless power 11 is generated by the analog circuit and is transmitted by the coil. It is appreciated that the configuration mentioned above is merely an example and the present invention is not limited thereto.

In an embodiment, the communication module 102 is configured for performing communication with the wireless power receiver 14 through a communication interface 13. In an embodiment, the communication interface 13 is independent from a power transferring path and can be implemented by using technologies such as, but not limited to Bluetooth Low Energy (BLE), WiFi, Zigbee, Near Field Communication (NFC), 3GPP Device to Device (D2D) Communication and 3GPP Machine to Machine (M2M) Communication. In another embodiment, the communication interface 13 is integrated in a power transferring path and can be implemented by using technologies such as, but not limited to the Load Modulation defined WPC LPWG and MPWG specification or FSK modulation defined in WPC MPWG specification.

Moreover, the communication module 102 is configured for performing communication with the remote mobile device 12 through a communication interface 15. In an embodiment, the communication interface 15 is independent from a power transferring path and can be implemented by using technologies such as, but not limited to Bluetooth Low Energy (BLE), WiFi, Zigbee, Near Field Communication (NFC), 3GPP Device to Device (D2D) Communication and 3GPP Machine to Machine (M2M) Communication. In another embodiment, the communication interface 15 is integrated in a power transferring path and can be implemented by using technologies such as, but not limited to the Load Modulation defined WPC LPWG and MPWG specification or FSK modulation defined in WPC MPWG specification.

It is appreciated that though the communication module 102 is illustrated as a single module in FIG. 1, the communication module 102 can be a composite communication module including two communication units (not illustrated) configured to perform communication through the communication interfaces 13 and 15 respectively.

The remote mobile device 12 is configured for transmitting a first request message 120 to the wireless power transmitter 10 through the communication interface 15 to request charging information of the wireless power receiver 14.

The processing module 104 is configured for receiving the first request message 120 through the communication module 102 by using the communication interface 15. The processing module 104 is further configured for determining whether the charging information of the wireless power receiver 14 is available in such as, but not limited to a storage module (not illustrated) in the wireless power transmitter 10.

Under a condition that at least first part of the charging information is available in the processing module 104, the processing module 104 transmits available information 101 that includes the at least first part of the charging information to the remote mobile device 12. In an embodiment, the processing module 104 periodically receives information of the wireless power receiver 14 therefrom through the communication module 102 by using the communication interface 13 that matches the at least first part of the charging information.

Under a condition that at least second part of the charging information of the wireless power receiver 14 is not available, the processing module 104 receives the provided information 140 that includes the at least second part of the charging information from the wireless power receiver 14 through the communication module 102 by using the communication interface 13.

In different embodiments, the provided information 140 can be received in various ways. In an embodiment, the communication interface 13 between the wireless power transmitter 10 and the wireless power receiver 14 is bi-directional. As a result, the processing module 104 transmits a second request message 103 to the wireless power receiver 14 through the communication module 102 by using the communication interface 13 to request the at least second part of the charging information not available in the wireless power transmitter 10. The processing module 104 further receives the provided information 140 of the wireless power receiver 14 subsequently through the communication module 102 by using the communication interface 13 and transmits the provided information 140 of the wireless power receiver 14 to the remote mobile device 12 through the communication module 102 by using the communication interface 15.

On the contrary, when the communication interface 13 is not bi-directional, the processing module 104 is not able to request the information actively and has to wait for the transmission from the wireless power receiver 14.

In an embodiment, each of the charging information, the available information 101 and the provided information 140 include a percentage of power in a battery of the wireless power receiver 14, a volume of the battery of the wireless power receiver 14, a temperature of the wireless power receiver 14, a temperature of the battery of the wireless power receiver 14, a remaining time to fully charge the battery of the wireless power receiver 14, a supplying power of the wireless power transmitter 10, a supplying voltage of the wireless power transmitter 10, a supplying current of the wireless power transmitter 10, a receiving power of the wireless power receiver 14, a receiving voltage of the wireless power receiver 14, a receiving current of the wireless power receiver 14 or a combination of the above.

In an embodiment, the charging information is identical to the provided information 140 and the available information 101. In another embodiment, the provided information 140 or the available information 101 may be only part of the charging information. Under such a condition, the processing module 10 only transmits the information that matches the part of the charging information to the remote mobile device 12.

In an embodiment, the processing module 10 is able to transmit the available information 101 that matches part of the charging information to the remote mobile device 12 first, request the remain part of the charging information and transmit the remain part of the charging information included in the provided information 140 to the remote mobile device 12 subsequently.

In another embodiment, the processing module 10 is able to request the part of the information from the wireless power receiver 14 not available in the wireless power transmitter 10 and transmit both the provided information 140 and the available information 101 in the wireless power transmitter 10 to the remote mobile device 12 subsequently.

In an embodiment, besides the information requested by the remote mobile device 12, the provided information 140 or the available information 101 may include additional information (not illustrated) not requested by the remote mobile device 12. The additional information may include an identity of the wireless power receiver 14 such as, but not limited to a model name, a device name, a device type or a specific name of the wireless power receiver 14.

As a result, the wireless power transmitter 10 can transmit the charging information of the wireless power receiver 14 under the request from the remote mobile device 12 to allow the user of the remote mobile device 12 monitoring the charging condition of the wireless power receiver 14.

Figure 2:
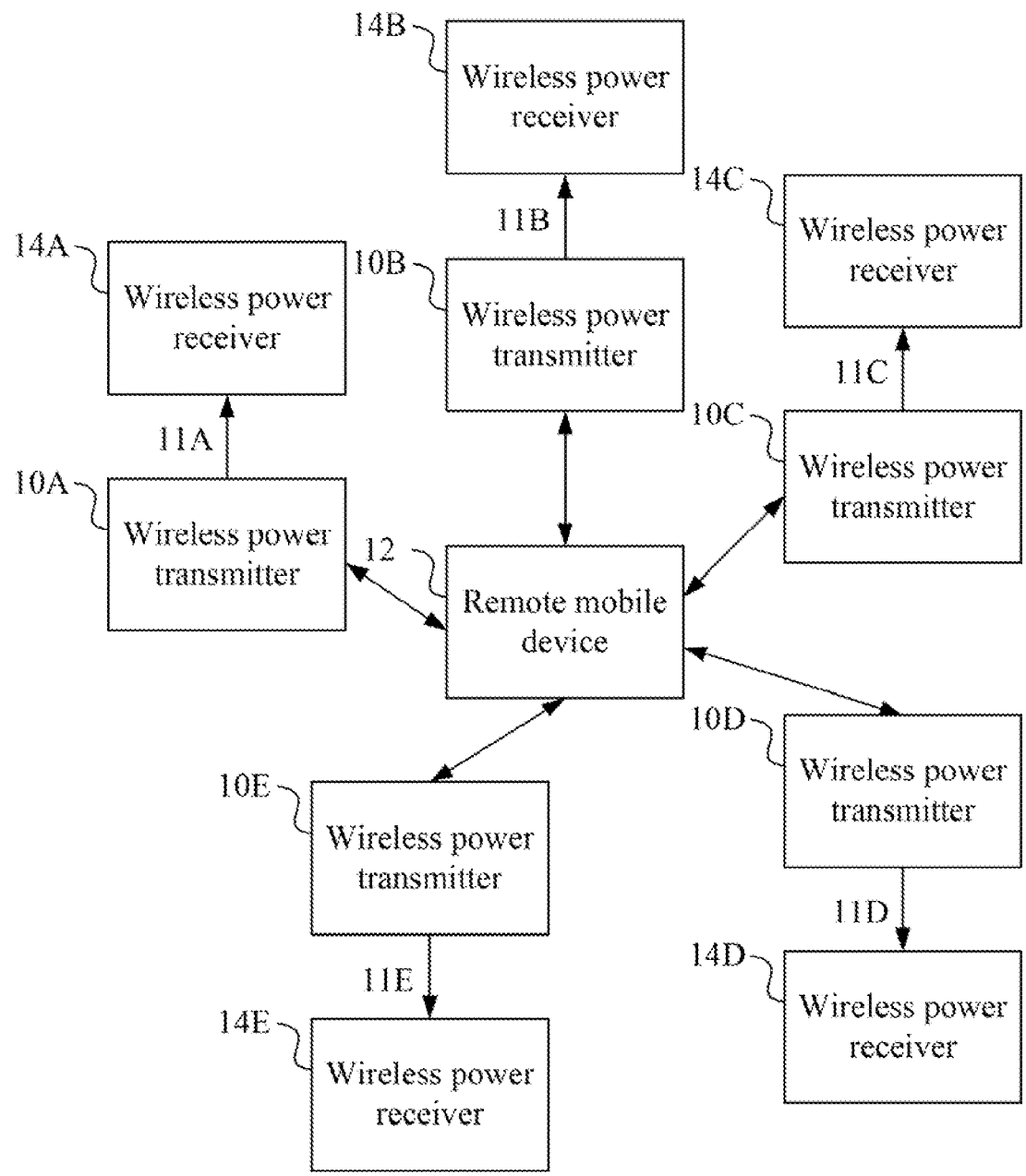
FIG. 2 is a block diagram of a plurality of wireless power transmitters, a remote mobile device and a plurality of wireless power receivers in an embodiment of the present invention.

Reference is now made to FIG. 2. FIG. 2 is a block diagram of a plurality of wireless power transmitters 10A-10E, a remote mobile device 12 and a plurality of wireless power receivers 14A-14E in an embodiment of the present invention.

It is appreciated that the number of wireless power transmitters 10A-10E can be any number more than one, such as five illustrated in FIG. 2. Each of the wireless power transmitters 10A-10E includes components identical to those in the wireless power transmitter 10 and operates in a similar way.

As a result, the wireless power transmitters 10A-10E provide wireless power 11A-11E to wireless power receivers 14A-14E respectively. Further, the wireless power transmitters 10A-10E can transmit the charging information of the wireless power receivers 14A-14E requested by the remote mobile device 12 respectively.

Figure 3:
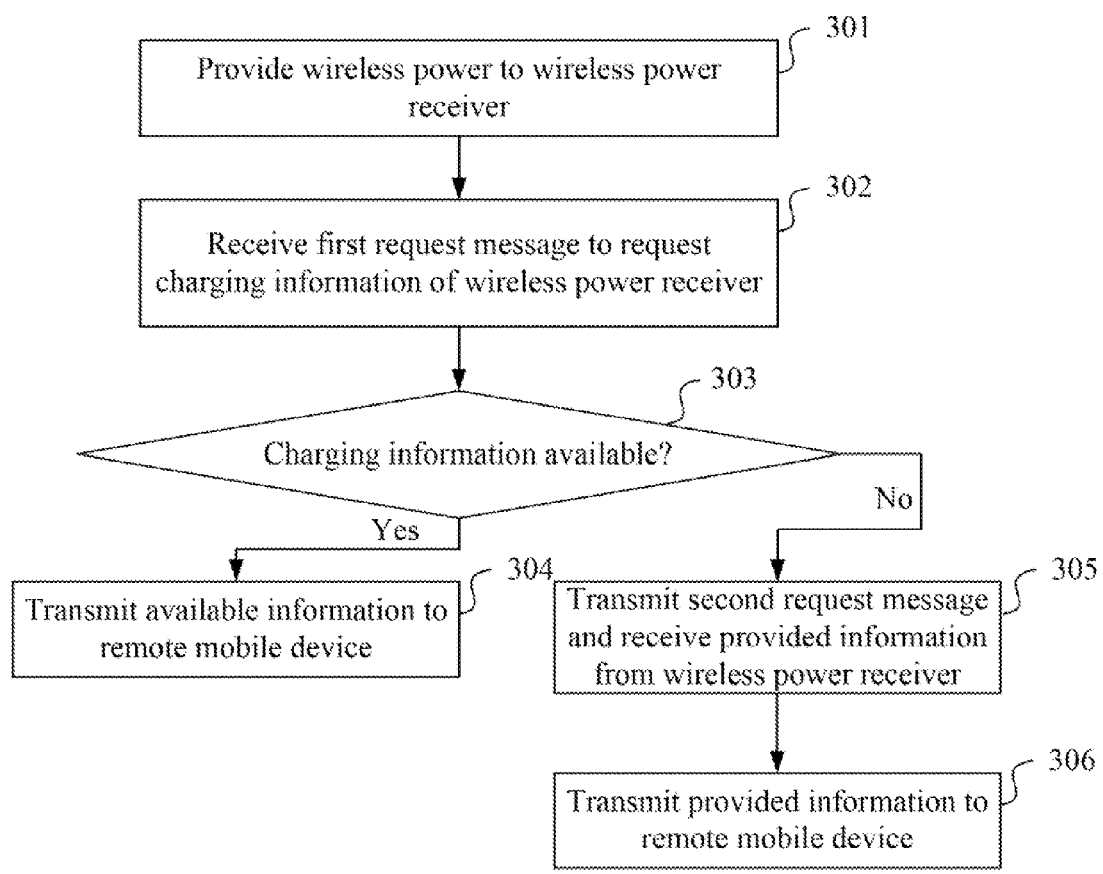
FIG. 3 is a flow chart of an operation method in an embodiment of the present invention.

Reference is now made to FIG. 3. FIG. 3 is a flow chart of an operation method 300 in an embodiment of the present invention. The operation method 300 can be used in the wireless power transmitter 10 illustrated in FIG. 1.

The operation method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the wireless power 11 is provided to the wireless power receiver 14 by the power transmitting module 100.

In step 302, the first request message 120 is received from the remote mobile device 12 by the processing module 104 through the communication module 102.

In step 303, whether the charging information of the wireless power receiver 14 is available is determined by the processing module 104.

In step 304, under a condition that at least first part of the charging information is available, the available information 101 that includes the at least first part of the charging information is transmitted to the remote mobile device 12 by the processing module 104 through the communication module 102.

In step 305, under a condition that at least second part of the charging information of the wireless power receiver 14 is not available, the processing module 104 transmits the second request message 103 to the wireless power receiver 14 through the communication module 102 to request the at least second part of the charging information and receives the provided information 140 that includes the at least second part of the charging information through the communication module 102.

The processing module 104 transmits the provided information 140 to the remote mobile device 12 through the communication module 102 in step 306.

To facilitate the description to follow, an operative example will be described in the paragraphs below with reference to FIG. 4. However, the present disclosure is not limited to the embodiment below.

Figure 4:
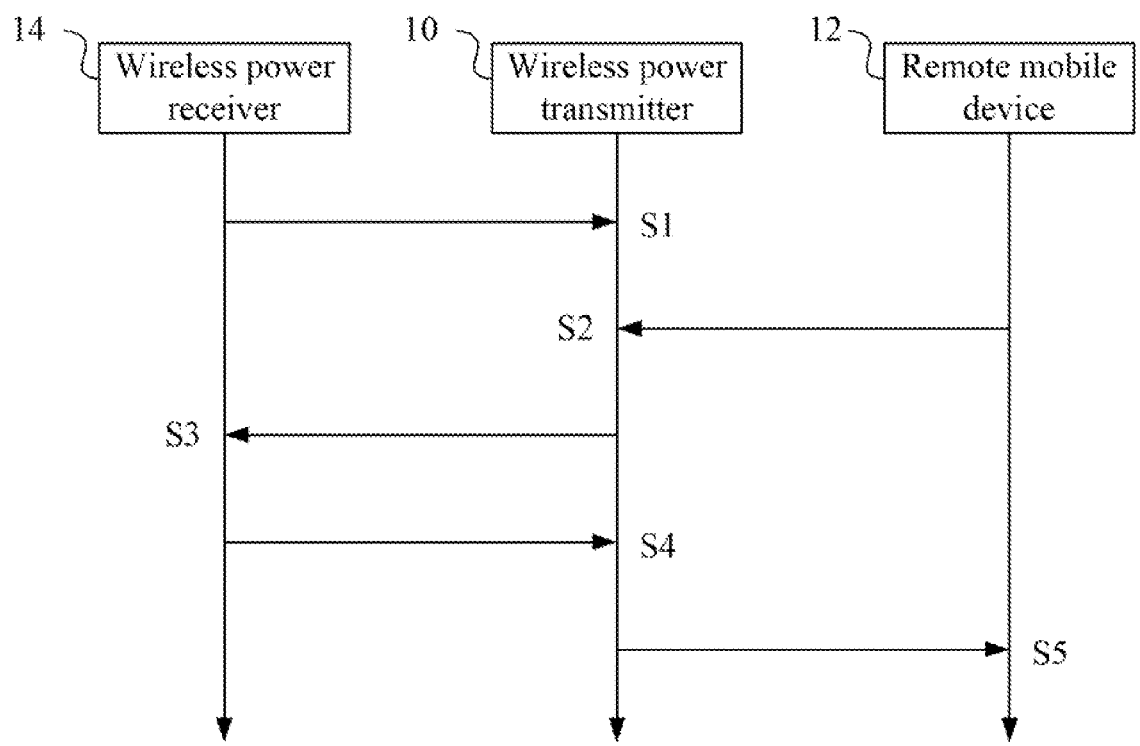
FIG. 4 is an exemplary message flow between the wireless power transmitter and the remote mobile device and between the wireless power transmitter and the wireless power receiver in an embodiment of the present invention.

Reference is now made to FIG. 4. FIG. 4 is an exemplary message flow 400 between the wireless power transmitter 10 and the remote mobile device 12 and between the wireless power transmitter 10 and the wireless power receiver 14 in an embodiment of the present invention. In this operative example, the operations in the wireless power transmitter 10 and the remote mobile device 12 are outlined below.

In operation S1, the wireless power transmitter 10 periodically receives the information of the wireless power receiver 14 therefrom as the available information 101 including such as, but not limited a current battery percentage of the wireless power receiver 14.

In operation S2, the wireless power transmitter 10 receives the first request message 120 from the remote mobile device 12, in which the first request message 120 requests the charging information including such as, but not limited a battery percentage and a batter volume of the wireless power receiver 14.

In operation S3, the wireless power transmitter 10 transmits a second request message 103 to the wireless power receiver 14 to request the information of the batter volume of the wireless power receiver 14 since such an information is not available in the wireless power transmitter 10.

In operation S4, the wireless power transmitter 10 receives the provided information 140 of the wireless power receiver 14 that includes the information of the batter volume of the wireless power receiver 14.

In operation S5, the wireless power transmitter 10 transmits the both the available information having the battery percentage of the wireless power receiver 14 and the provided information having the batter volume of the wireless power receiver 14 to the remote mobile device 12.

Although the present invention has been described in considerable detail with reference to certain embodiments thereof, other embodiments are possible, Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A wireless power transmitter comprising:
a power transmitting module configured for providing a wireless power to a wireless power receiver;
a communication module; and
a processing module electrically connected to the power transmitting module and the communication module, wherein the processing module is configured for:
receiving a first request message from a remote mobile device through the communication module to request charging information of the wireless power receiver;
determining whether the charging information is available;
under a condition that at least first part of the charging information is available, transmitting available information comprising the at least first part of the charging information through the communication module to the remote mobile device;
under a condition that at least second part of the charging information is not available, receiving provided information comprising the at least second part of the charging information from the wireless power receiver through the communication module; and
transmitting the provided information through the communication module to the remote mobile device.

2. The wireless power transmitter of clam 1, wherein receiving the provided information further comprises:
the processing module transmitting a second request message through the communication module to the wireless power receiver to request the at least second part of the charging information and receiving the provided information subsequently.

3. The wireless power transmitter of claim 1, wherein the processing module is further configured for periodically receiving information of the wireless power receiver therefrom through the communication module as the available information.

4. The wireless power transmitter of claim 1, wherein each of the charging information, the available information and the provided information comprises a percentage of power in a battery of the wireless power receiver, a volume of the battery of the wireless power receiver, a temperature of the wireless power receiver, a temperature of the battery of the wireless power receiver, a remaining time to fully charge the battery of the wireless power receiver, a supplying power of the wireless power transmitter, a supplying voltage of the wireless power transmitter, a supplying current of the wireless power transmitter, a receiving power of the wireless power receiver, a receiving voltage of the wireless power receiver, a receiving current of the wireless power receiver or a combination of the above.

5. The wireless power transmitter of claim 1, wherein the charging information is either identical to the available information or the provided information.

6. The wireless power transmitter of claim 1, wherein the processing module is further configured for transmitting additional information through the communication module to the remote mobile device, wherein the additional information is comprised in the available information or in the provided information.

7. The wireless power transmitter of claim 6, wherein the additional information comprises an identity of the wireless power receiver that comprises a model name, a device name, a device type or a specific name of the wireless power receiver.

8. The wireless power transmitter of claim 1, wherein at least one of communication interfaces between the wireless power transmitter and the remote mobile device and between the wireless power transmitter and the wireless power receiver is independent from a power transferring path.

9. The wireless power transmitter of claim 1, wherein at least one of communication interfaces between the wireless power transmitter and the remote mobile device and between the wireless power transmitter and the wireless power receiver is integrated in a power transferring path.

10. An operation method used in a wireless power transmitter comprising:
providing a wireless power to a wireless power receiver by a power transmitting module;
receiving a first request message from a remote mobile device through a communication module to request charging information of the wireless power receiver;
determining whether the charging information is available;
under a condition that at least first part of the charging information is available, transmitting available information comprising the at least first part of the charging information through the communication module to the remote mobile device;
under a condition that at least second part of the charging information is not available, receiving provided information comprising the at least second part of the charging information from the wireless power receiver through the communication module; and
transmitting the provided information through the communication module to the remote mobile device.

11. The operation method of claim 10, wherein receiving the provided information further comprises:
transmitting a second request message through the communication module to the wireless power receiver to request the at least second part of the charging information and receiving the provided information subsequently.

12. The operation method of claim 10, further comprising:
periodically receiving information of the wireless power receiver therefrom through the communication module as the available information.

13. The operation method of claim 10, wherein each of the charging information, the available information and the provided information comprises a percentage of power in a battery of the wireless power receiver, a volume of the battery of the wireless power receiver, a temperature of the wireless power receiver, a temperature of the battery of the wireless power receiver, a remaining time to fully charge the battery of the wireless power receiver, a supplying power of the wireless power transmitter, a supplying voltage of the wireless power transmitter, a supplying current of the wireless power transmitter, a receiving power of the wireless power receiver, a receiving voltage of the wireless power receiver, a receiving current of the wireless power receiver or a combination of the above.

14. The operation method of claim 10, wherein charging information is either identical to the available information or the provided information.

15. The operation method of claim 10, further comprising:
transmitting additional information through the communication module to the remote mobile device by the wireless power transmitter, wherein the additional information is comprised in the available information or in the provided information.

16. The operation method of claim 15, wherein the additional information comprises an identity of the wireless power receiver that comprises a model name, a device name, a device type or a specific name of the wireless power receiver.

17. The operation method of claim 10, wherein at least one of communication interfaces between the wireless power transmitter and the remote mobile device and between the wireless power transmitter and the wireless power receiver is independent from a power transferring path.

18. The operation method of claim 10, wherein at least one of communication interfaces between the wireless power transmitter and the remote mobile device and between the wireless power transmitter and the wireless power receiver is integrated in a power transferring path.

* * * * *